United States Patent [19]

Chan

[11] Patent Number: 5,343,539
[45] Date of Patent: Aug. 30, 1994

[54] METHOD FOR SPATIAL DOMAIN IMAGE COMPRESSION

[76] Inventor: Yiu K. Chan, Flat 5A, Block 10 88 Tat Chee Avenue, Kowloon Tong, Kowloon, Hong Kong

[21] Appl. No.: 919,866

[22] Filed: Jul. 27, 1992

[51] Int. Cl.$^5$ .............................................. G06K 9/36
[52] U.S. Cl. ........................................ 382/56; 348/421
[58] Field of Search .................. 382/56, 41, 44, 27; 358/262.3, 262.1, 133, 136; 348/384, 420, 421

[56] References Cited

U.S. PATENT DOCUMENTS

| | | | |
|---|---|---|---|
| 3,974,325 | 8/1976 | Wilmer | 178/6 |
| 3,992,572 | 11/1976 | Nakagome et al. | 178/6 |
| 4,150,401 | 4/1979 | Yamamoto et al. | 358/260 |
| 4,319,267 | 3/1982 | Mitsuya et al. | 358/260 |
| 4,409,623 | 10/1983 | Kobayashi et al. | 358/261 |
| 4,723,298 | 2/1988 | Schiller | 382/56 |
| 4,742,558 | 5/1988 | Ishibashi et al. | 382/56 |
| 4,768,082 | 8/1988 | Hiratsuka et al. | 358/260 |
| 4,788,498 | 11/1988 | Ochi et al. | 382/56 |
| 4,797,741 | 1/1989 | Sato et al. | 382/56 |
| 4,803,558 | 2/1989 | Hiratsuka et al. | 382/56 |
| 4,853,778 | 8/1989 | Tanaka | 358/133 |
| 4,885,636 | 12/1989 | Sullivan | 358/133 |
| 4,885,786 | 12/1989 | Anderson et al. | 382/44 |
| 4,903,128 | 2/1990 | Thoreau | 358/340 |
| 4,903,138 | 2/1990 | Aragaki | 358/133 |
| 4,944,023 | 7/1990 | Imuo et al. | 382/56 |
| 4,947,447 | 8/1990 | Miyaoka et al. | 382/56 |
| 4,965,754 | 10/1990 | Stansfield et al. | 382/56 |
| 4,965,843 | 10/1990 | van Dorsselaer | 382/56 |
| 5,001,559 | 3/1991 | Gonzales et al. | 358/133 |
| 5,007,001 | 4/1991 | Lloyd-Williams | 382/56 |
| 5,014,134 | 5/1991 | Lawton et al. | 358/262.1 |
| 5,020,121 | 5/1991 | Rosenberg | 382/56 |
| 5,022,091 | 6/1991 | Carlson | 382/56 |
| 5,038,389 | 8/1991 | Mizuno | 382/56 |
| 5,065,447 | 11/1991 | Barnsley et al. | 382/56 |
| 5,068,911 | 11/1991 | Resnikoff et al. | 382/56 |
| 5,073,966 | 12/1991 | Sato | 382/56 |
| 5,086,489 | 2/1992 | Shimura | 382/56 |
| 5,093,872 | 3/1992 | Tutt | 382/56 |
| 5,101,443 | 3/1992 | Behrmann-Poitiers | 382/56 |
| 5,107,345 | 4/1992 | Lee | 358/136 |
| 5,127,064 | 6/1992 | Flinois et al. | 382/56 |
| 5,163,104 | 11/1992 | Ghosh et al. | 358/261.3 |
| 5,166,987 | 11/1992 | Kagoyama | 382/56 |

*Primary Examiner*—Joseph Mancuso
*Attorney, Agent, or Firm*—Darby & Darby

[57] ABSTRACT

A method of spatial domain image compression comprises splitting the image up into a plurality of 2*2 sub-blocks, and then compressing each sub-block where this can be done without unacceptable loss of detail by encoding it to either 1, 2, or 3 intensity values. On a second pass, the sub-blocks can themselves be concatenated into larger-sub-blocks, so achieving further compression, and those larger-sub-blocks can on a third pass be concatenated into still-larger-sub-blocks. The computational time required by the algorithm is low, both for compression and for decompression.

28 Claims, 10 Drawing Sheets

| Minimum SoS | Representation |
|---|---|
| SoS 1 | m1　m1<br>m2　m2 |
| SoS 2 | m1　m2<br>m1　m2 |
| SoS 3 | m1　m2<br>m2　m1 |
| SoS 4 | m2　m1<br>m1　m1 |
| SoS 5 | m1　m1<br>m2　m1 |
| SoS 6 | m1　m1<br>m1　m2 |
| SoS 7 | m1　m2<br>m1　m1 |

FIG. 6

| Minimum SoS | Representation |
|---|---|
| SoS 8 | m m<br>c d |
| SoS 9 | m b<br>m d |
| SoS 10 | a b<br>m m |
| SoS 11 | a m<br>c m |
| SoS 12 | m b<br>c m |
| SoS 13 | a m<br>m d |

FIG. 7

METHOD FOR SPATIAL DOMAIN IMAGE COMPRESSION

The present invention relates to spatial domain image compression.

There are a number of prior art image compression techniques that operate in the spatial domain. One such technique is known as Vector Quantization (VQ), a technique that was first proposed in 'an algorithm for vector quantization design', IEEE Trans Comm, Volume 28 pages 84–95, January 1980 by Y. Linde, A. Buzo and R. M. Gray. The VQ method operates by dividing the original N*M image into a number of m*m blocks of sub-images, m being very much greater than N. Each of these sub-image blocks has 2 (8*m*m) possible patterns. However, only a small number of patterns (P), very many fewer than the number of possible patterns, are used to represent the sub-image blocks. These P patterns form a 'codebook' such that the error between the original image and the coded compressed image is a minimum. In practice, it is found that the VQ compression ratio is good, but because the algorithm is iterative it is time consuming to produce the 'codebook' representing the essential features of the original image.

A further method of image compression, again operating in the spatial domain, is known as 'Block Truncation Code'. The original image is divided up into m*m sub-image blocks, the usual practice being m=4. The pixels in each sub-image block are then encoded using two grey intensity levels I1 and I2 such that the error between the original and the compressed image block is minimized. The compression ratio, for any given compressed image quality, is inferior to VQ and the block truncation code method is rarely used nowadays. Reference to it may be found in the article 'A Generalised Block Truncation Coding Algorithm for Image Compression' in IEEE Trans Acoustics Speech and Signal Processing, Volume ASSP-32, pages 664–668, June 1984 by D. R. H. Halverson, N. C. Griswold and G. L. Wise.

Other types of image compression operate not in the spatial domain but in the frequency domain. In the Discrete Cosine Transform method (DCT), the original image is divided into m*m blocks (usually m=8), each block then undergoing a DCT transform to convert the spatial image into the frequency domain. Although it is widely believed that DCT represents the best sub-optimal transform in image coding for the purposes of image compression, the computational requirements for DCT are high. Major efforts have been devoted to finding fast algorithms for DCT, for example 'Fast Algorithm and Implementation of 2-D Discrete Cosine Transform', IEEE Transaction on Circuits and Systems, Volume 38 Number 3, pages 297–305, March 1991.

One commercial system based on DCT is that of the Joint Photographic Expert Group (JPEG) standard that breaks up an image into square blocks of 8 by 8 pixels. DCT is then applied to each individual block to concentrate the energy represented in that region into a few coefficients representing frequencies. Compression is achieved by discarding higher frequencies lying outside the range of visible light, and the retained DCT coefficients are then quantized to reduce their magnitude. Finally, run-length and Huffman encoding are applied to achieve an improved compression ratio. For further details reference may be made to 'An Introduction to Data Structure with Applications' J. P. Tremblay and P. G. Sorenson, Pages 538–539, MacGraw Hill 1976. One specific example of hardware implementation of the JPEG standard is CL550 by C-Cube Microsystem.

There are a number of variations of the above methods using differing transformations and encoding schemes. For example, VQ techniques can replace Huffman encoding after DCT, and this alternative approach has been found to result in a better compression ratio at the expense of higher computational complexity. The DCT and VQ combination is described in the article 'A Comparison of Vector Quantization Techniques in Transform and Subband Coding of Imagery' in Signal Processing: Image Communication 3(1991) pages 91–105 by Mary E. Blain and Thomas R. Fischer. In that article it is shown that DCT and subband techniques achieve similar compression ratios. In subband coding, the original image is divided into several subbands by means of the Quadrature Mirror Filter Bank technique. The bit resources are allocated dynamically into subbands according to their energies, with more bits being allocated to the high energy subband.

It is an object of the present invention to provide an image compression method which combines a high compression ratio with low computational complexity.

According to the present invention a method of spatial domain image compression is characterized by those features set out in the characterizing portion of claim 1.

According to a second aspect, a method of spatial domain image compression is characterized by those features set out in the characterizing portion of claim 25.

The algorithm of the present invention is applied directly in the spatial domain, but is quite different from other known spatial domain compression techniques. It has the advantage that the amount of storage required for the compressed image is generally an order of magnitude lower than the original image, with an acceptable reproduction being produced on decompression. The algorithm of the present invention compares favourably with present state-of-the-art compression algorithms in terms of compression ratio and computing resources required. Another characteristic of the algorithm is that the reproduction time required is less than the compression time, and it is therefore exceptionally suited to decoder-only applications.

From the point of view of computational complexity, the algorithm of the present invention is, it is believed, superior to the prior art discussed above. The compression ratio achieved is generally in line with that of the prior art, but is slightly inferior to the compression ratio which is achieved by the 'second public release of the independent JPEG's-free JEPG software dated 13th Dec. 1991'.

For users who require an enlarged image of low to medium quality, the present invention has as an optional feature a 'zoom' capability which can easily be integrated into the basic algorithm. This zoom capability allows the user to enlarge the reconstructed image E times, where E is normally 2. This 'zoom' capability in effect increases the compression ratio by a factor of 4.

If improved visual quality is required in the reconstructed image, it is relatively easy to smooth out the blocky effect that might otherwise be apparent between adjacent smooth sub-blocks by simple interpolation techniques.

The present invention may be carried into practice in a number of ways and one specific embodiment will now be described, by way of example, with reference to the accompanying drawings in which:

FIG. 6 is a look-up table for use with reference to FIG. 2;

FIG. 7 is a look-up table for use with reference to FIG. 3.

It is assumed for the sake of this example that the target image to be compressed is a continuous tone rectangular image of M*N pixels. In this embodiment, both M and N should be even, and if they are not they should be made to be even by the addition of fictitious pixels along one or more of the edges. The image is then divided up into a plurality of square blocks (SBs) each of 2*2 pixels.

Briefly, the method to be described in more detail below consists of considering each square block in turn and, where the intensities of all four pixels are the same or similar, storing that block in computer memory as if it were all of a single intensity. If two of the pixels are substantially of a first intensity, and the other two are substantially of a second intensity, the square block is represented by dual intensity levels in memory. Likewise, if three of the pixels are substantially of a first intensity, and the fourth pixel is of a different intensity, that square block can also be represented by dual intensity levels. If two of the four pixels are of a similar intensity, and the third and fourth pixels are each of different intensities, the square block may then be represented by triple intensities. Finally, if all four pixels are of substantially different intensities, the square block is said to be irreducible and can only be represented in memory by storing the original four intensity levels of the separate pixels.

A 2*2 block is said to be 'smooth' if it is represented under this scheme by a single intensity level. If, after encoding each of the 2*2 square blocks making up the image by single, dual, triple or quadruple intensity representations, it is found that there are several single intensity (smooth) blocks side by side, these smooth blocks can then be concatenated to form larger blocks of 4*4 pixels, 8*8 pixels and so on. In this way, larger blocks can be represented in memory simply by storing a single intensity level.

A more detailed description of the specific embodiment will now follow, with reference to the flow charts making up FIGS. 1–5. For the purposes of discussion, it will be assumed that the configuration of the image to be compressed is as follows:

| N Columns, M Rows | | | |
| --- | --- | --- | --- |
| 0,0 | 0,1 | 0,N-2 | 0,N-1 |
| 1,0 | 1,1 | 1,N-2 | 1,N-1 |
| .. | .. | .. | .. |
| .. | .. | .. | .. |
| M-2,0 | M-2,1 | M-2,N-2 | M-2,N-1 |
| M-1,0 | M-1,1 | M-1,N-2 | M-1,N-1 |

Figure 1A:
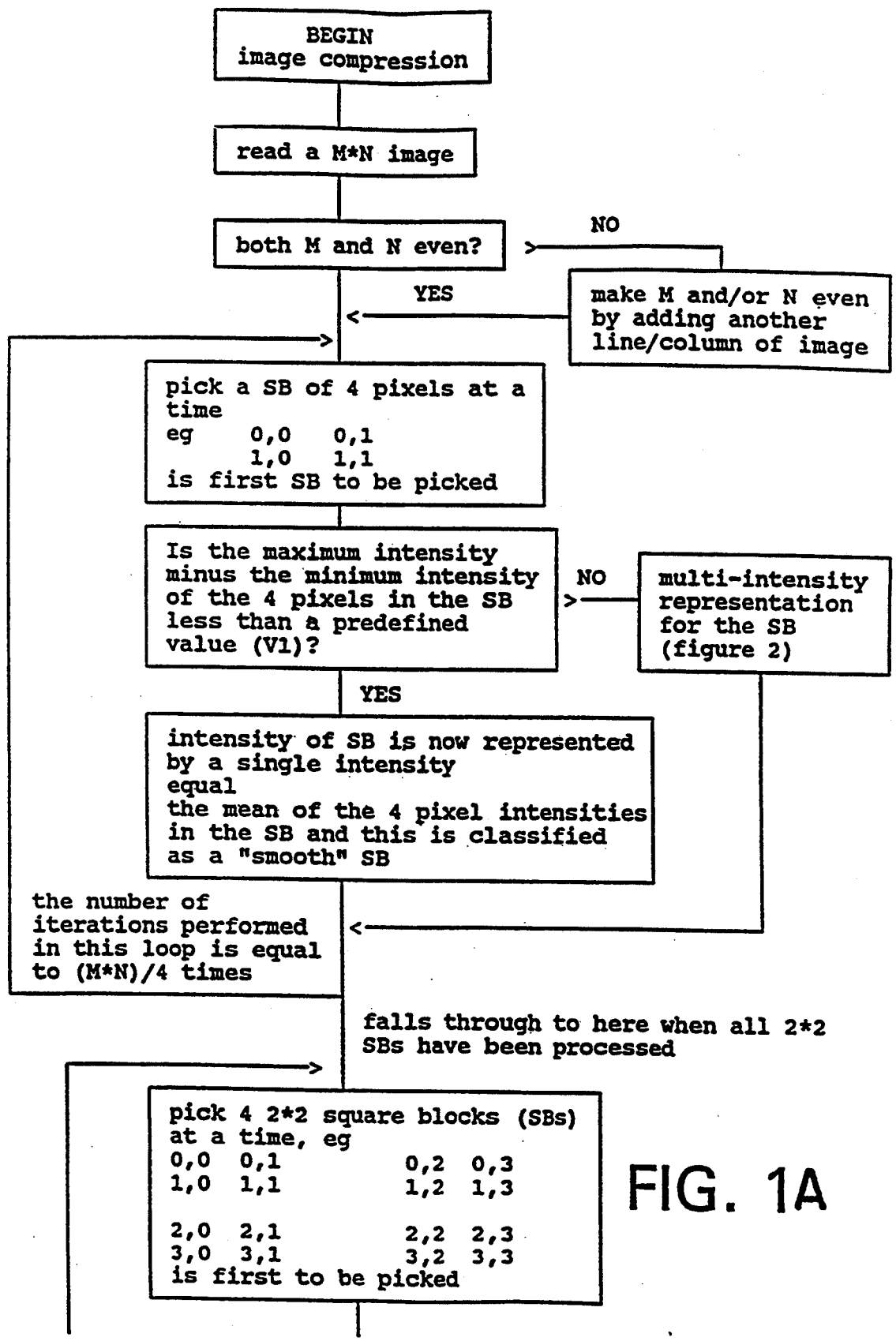
FIGS. 1A and 1B are a flow-chart illustrating image compression.
Figure 1B:
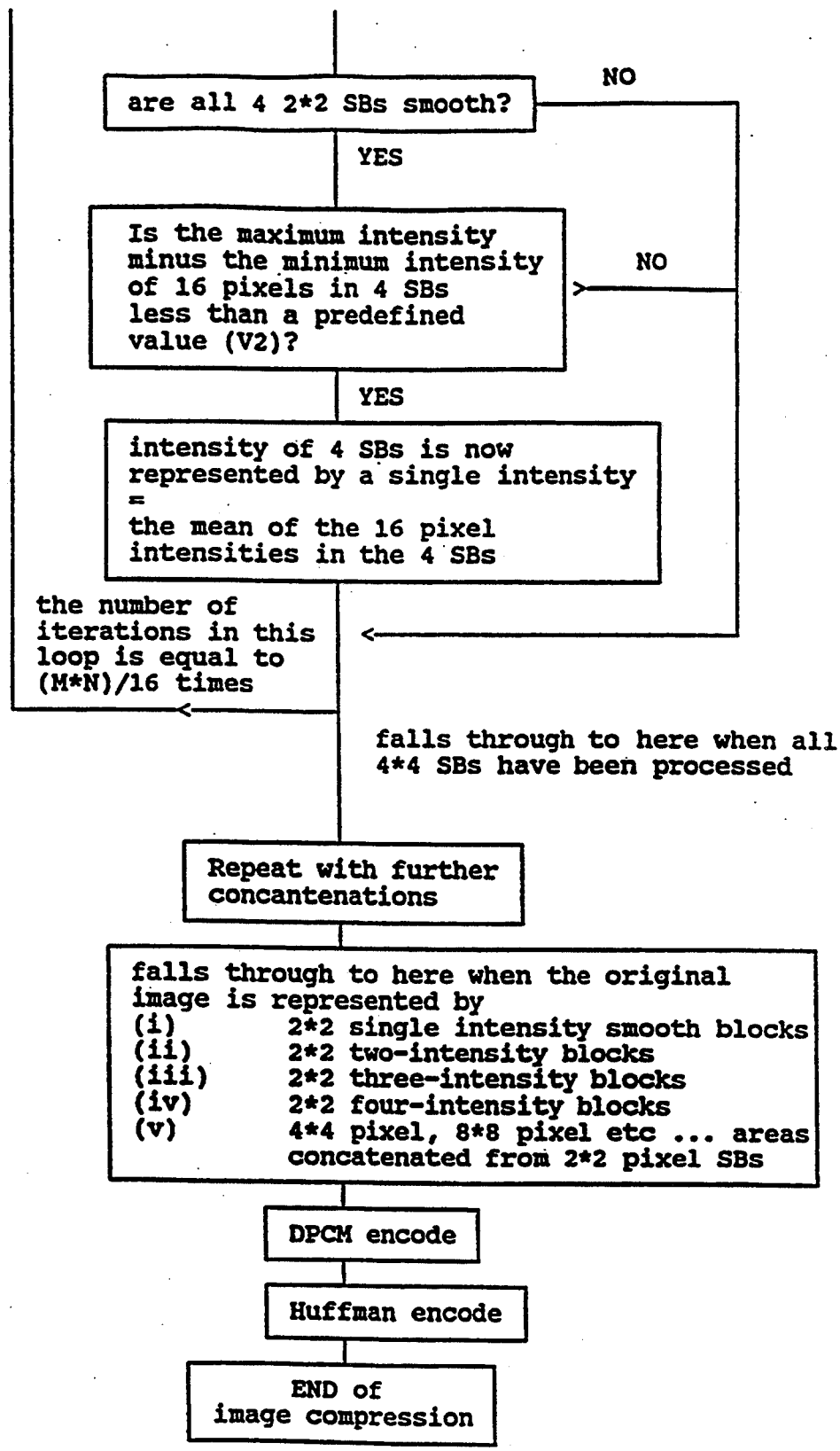

Referring first to FIG. 1, image compression starts by the reading-in of a M*N image, and the making of both M and N even by the addition if necessary of another line or column to the image.

The analysis proper starts with a consideration of the first 2*2 pixel, and it is firstly determined whether the maximum intensity value minus the minimum intensity value within that square block is less than a predefined value (V1). If the maximum minus the minimum intensity is greater than V1, then a multi-intensity representation will be required for this particular square block, and the algorithm then follows the steps set out in FIG. 2 (to be described later). On the other hand, if the difference is less than V1, the intensity of the entire square block is stored as a single intensity, this being the mean of the four original pixel intensities. Such a block is then known as a 'smooth' square block.

These steps are repeated until all the 2*2 square blocks of the original image have been processed. Next, the algorithm attempts to concatenate any four adjacent smooth blocks there may be in the partially processed image, so as to create even higher image compression ratios without sacrificing a significant amount of visual quality.

Four adjacent 2*2 square blocks are now considered at once. If all four of the 2*2 square blocks are not smooth, it is clear that no further compression can be carried out, and the algorithm then passes on to the next block of four 2*2 square blocks. If all four of the square blocks are smooth, however, the maximum intensity minus the minimum intensity of the individual pixels is determined. If this is greater than a predefined value (V2), no further compression can be carried out; otherwise, the intensity of the four 2*2 square blocks is represented by a single new intensity which is defined to be the mean of the sixteen pixel intensities in the four square blocks. The next four 2*2 square blocks are then considered in a similar manner.

These steps are repeated until a second pass has been made over the entire image at the level of four 2*2 square blocks.

If desired, further concatenations may be carried out in the same way by considering successively larger areas; in each case, four times the area of the previous blocks. The precise number of passes to be carried out (if any) after the first pass at the 2*2 square block level may be selected according to the size of the image to be processed, and the balance to be struck between the amount of processing time required and the final compression ratio.

At the completion of this process, the image will be represented by 2*2 single-intensity smooth blocks, 2*2 two-intensity blocks, 2*2 three-intensity blocks, 2*2 four-intensity blocks-and perhaps by larger blocks or areas of 4*4 pixels, 8*8 pixels and so on which have been concatenated from 2*2 square blocks. Although not shown in the flow diagram, the relative sizes and positions of each of these blocks and areas, along with their intensity representations, have been recorded.

To maximize the compression ratio, Difference Pulse Code Modulation (DPCM) is then used. This means that for calculated intensities I1, I2, . . . , Im, In, the intensity I1 is encoded in the normal way but the rest of the intensities become (I2−I1), (I3−I2), ..., (In−Im). All smooth blocks are then quantized modulo 4. In other words the value of I1, (I2−I1), etc take the values 0, plus or minus 4, plus or minus 8 and so on.

Edgy blocks (in other words blocks which are not smooth) are encoded in exactly the same way except to modulo 16, i.e. 0, plus or minus 16, plus or minus 32 and so on.

The quantized compressed image data is then further encoded using the Huffman coding scheme to maximize the compression ratio.

Figure 2A:
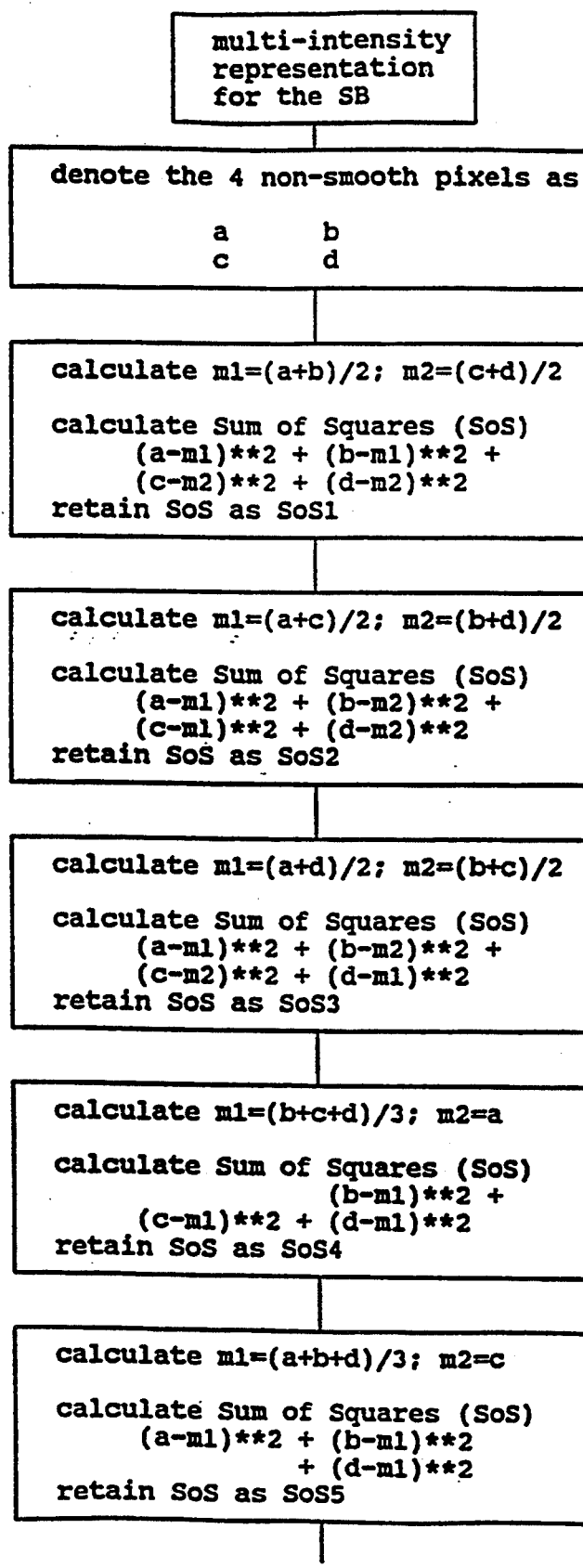
FIGS. 2A and 2B illustrate multi-intensity encoding for a square block.
Figure 2B:
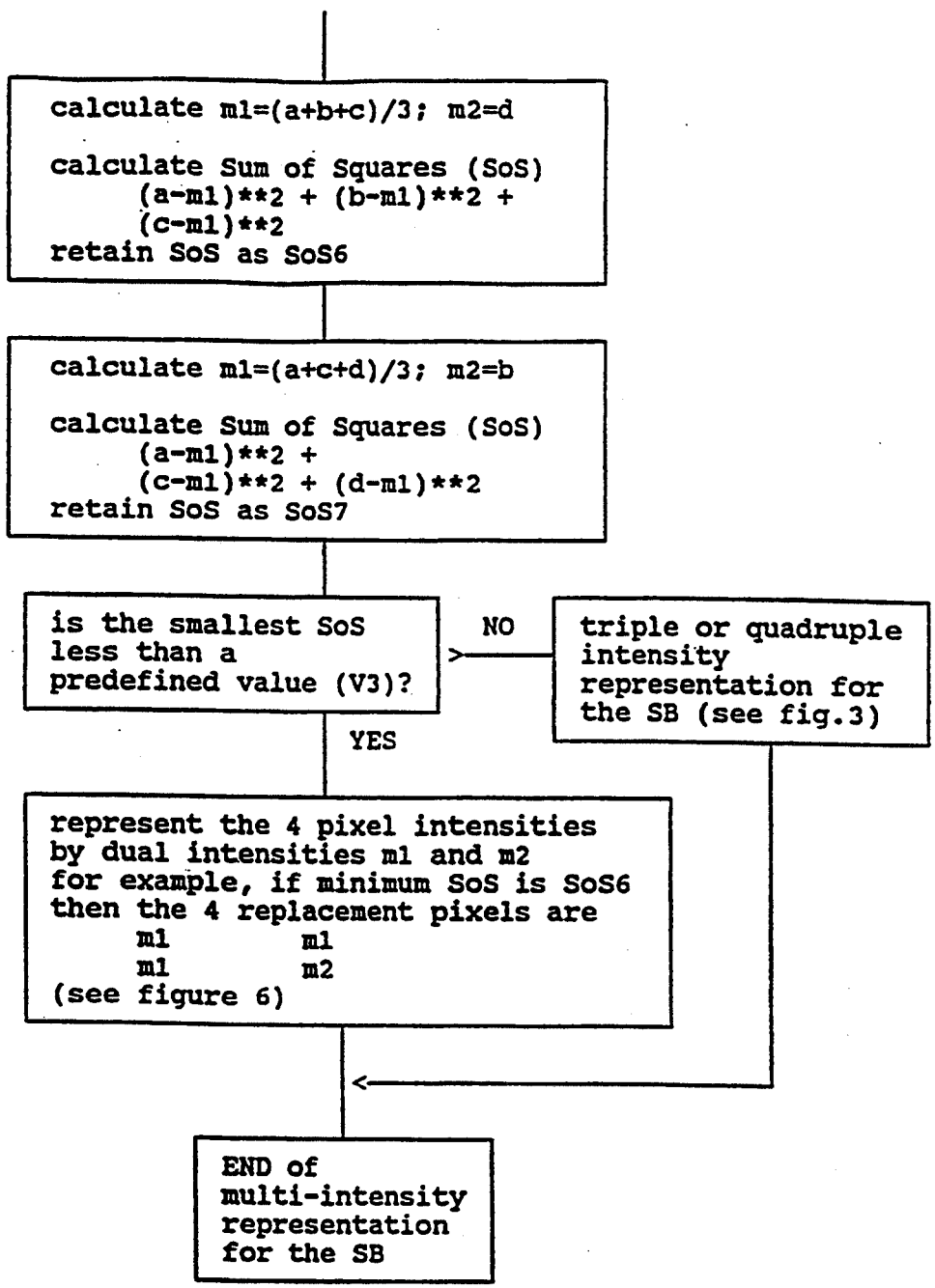

Turning now to FIG. 2, there is shown a flow chart for creating multi-intensity representations of 2*2 square blocks. This is used when a particular original square block cannot be encoded as a smooth (single intensity) square block. The multi-intensity algorithm proceeds by calculating a number of different sums of squares, derived from the individual pixel intensities, and determining which is the lowest. If the lowest sum of squares is less than a predetermined value (V3), the square block is encoded as a dual intensity representation using the look-up table of FIG. 6.

Figure 3A:
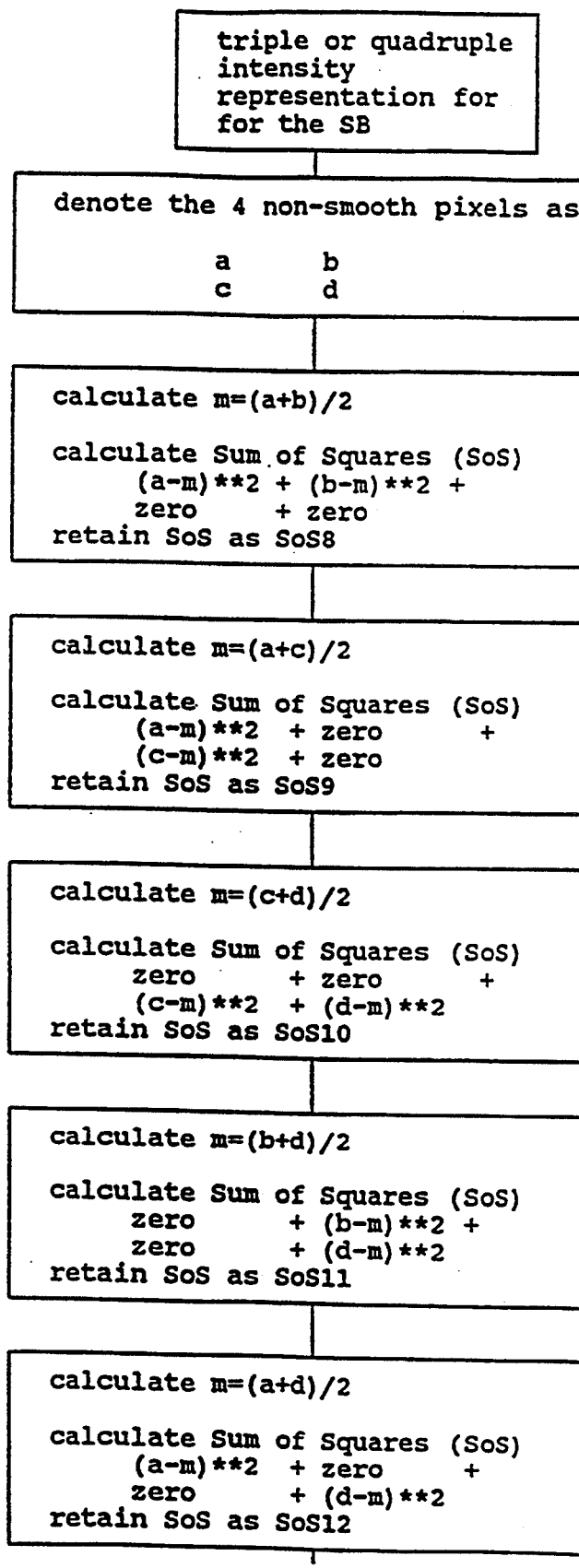
FIGS. 3A and 3B illustrate triple or quadruple intensity encoding for a square block.
Figure 3B:
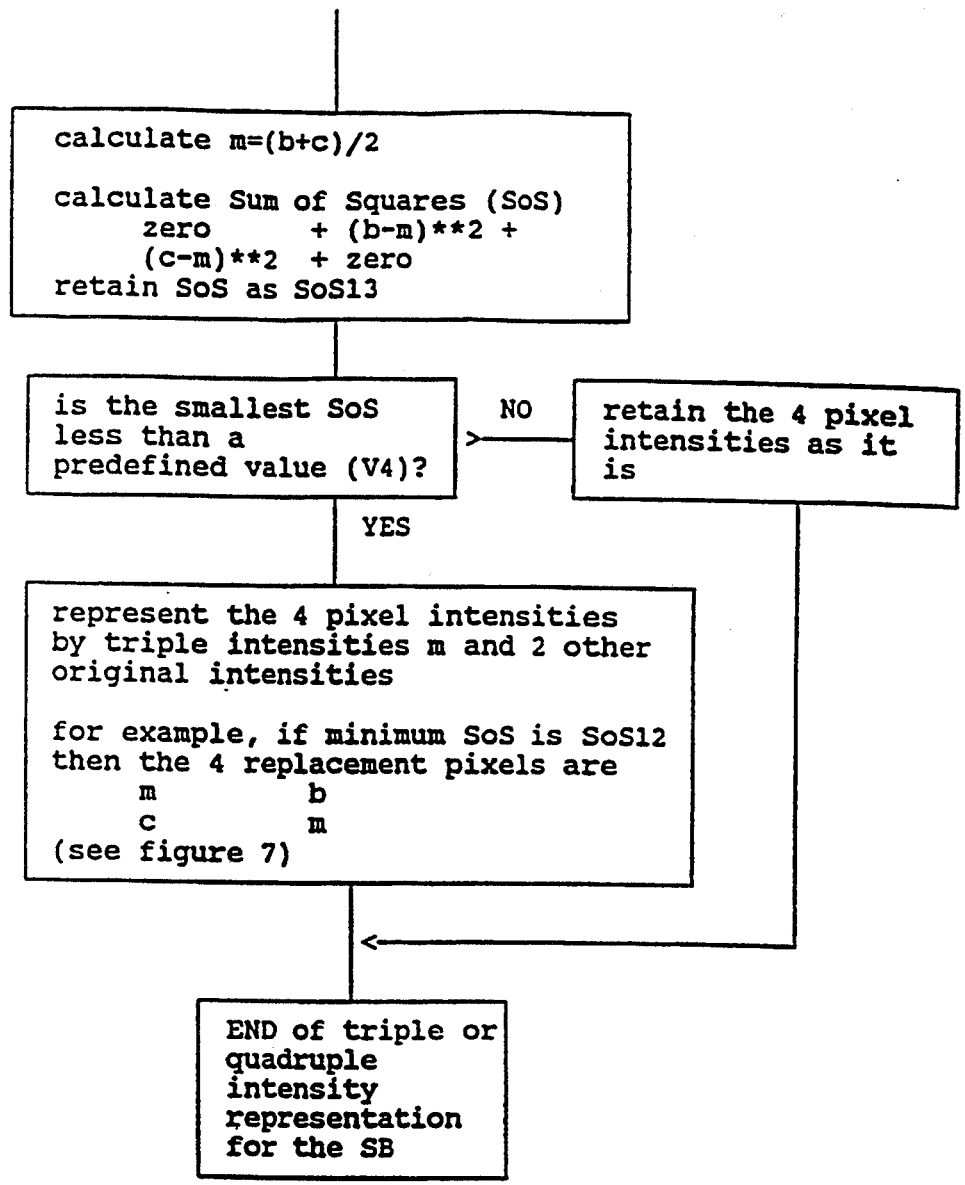

FIG. 3 shows the algorithm that is used in the event that the square block is not suitable for either a single or a dual intensity representation. Again, several sums of squares are calculated, and the lowest value is compared with a further predefined value (V4). If the smallest sum of squares is less than V4, the square block is irreducible, and the four pixel intensities are retained as they are. Otherwise, the square block is defined by a triple identity representation, according to the look-up table of FIG. 7.

Figure 4:
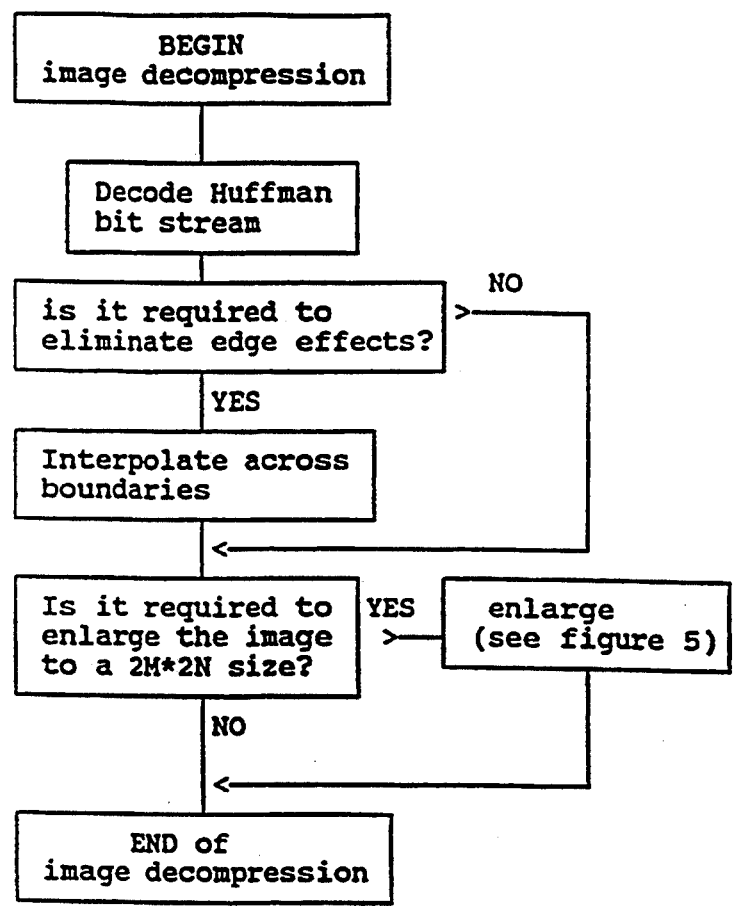
FIG. 4 illustrates image decompression.

FIG. 4 shows the steps required to effect image decompression. First, the Huffman encoded bit-stream is decoded to recover the following information:
1. the sizes and locations of the 2*2 square blocks, and the 4*4 blocks, 8*8 blocks and so on (if any),
2. from the differences (I2−I1), ..., (In−Im), the intensities I1, I2, ..., Im, In. These are then decoded from their Huffman encoded representation.
3. Similarly, the intensities are recovered in the same manner for the two, three and four intensity 'edgy' blocks.

Once all the information has been recovered, interpolation across boundaries is carried out, if required, to eliminate edge effects that might otherwise exist between adjacent smooth 2*2 square blocks. The interpolation is effected such that for example:

| a a | b b | | a a | b b |
| a a | b b | becomes | a w | x b |
| c c | d d | → | c y | z d |
| c c | d d | | c c | d d | where w, x, y, z, represent the interpolated inner intensities.

Figure 5:
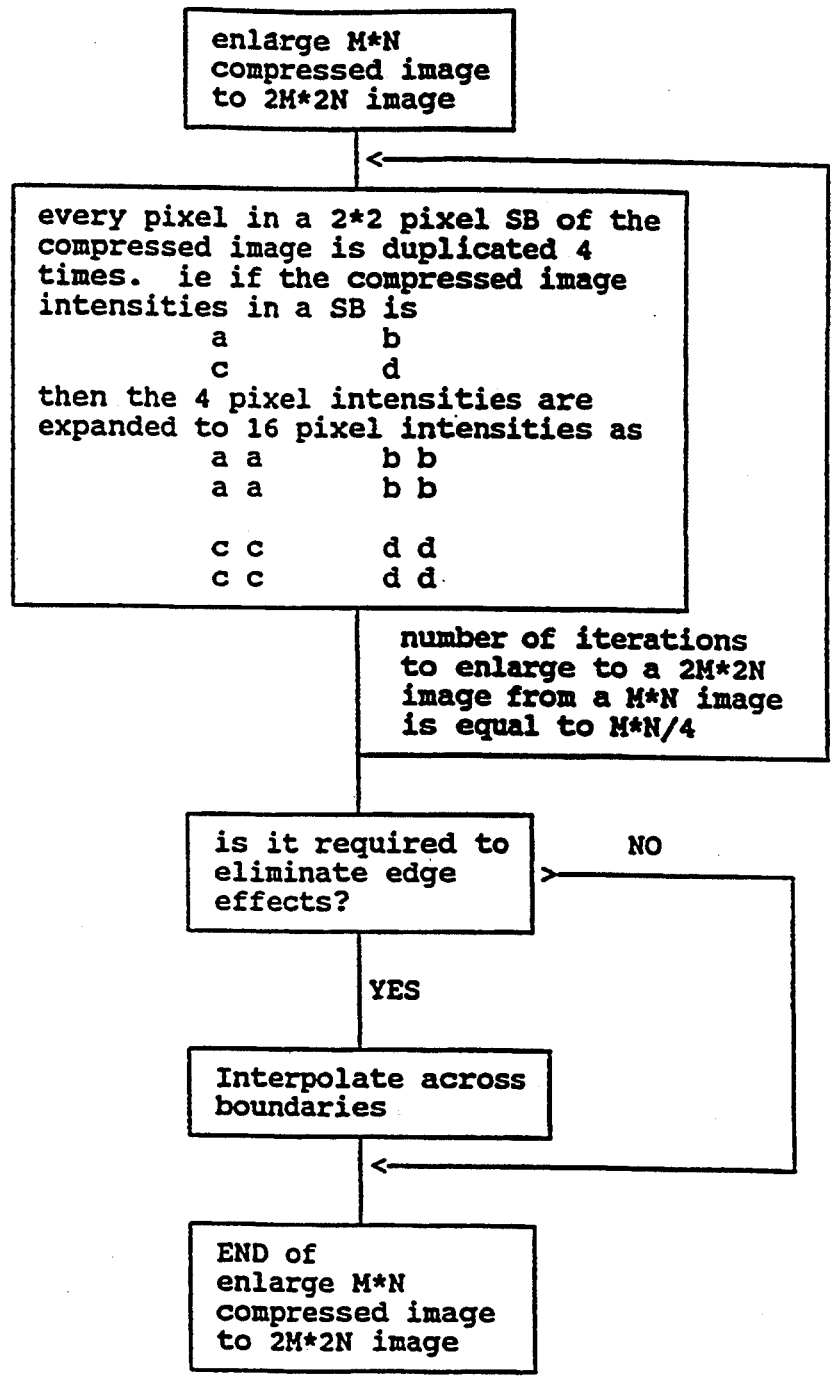
FIG. 5 illustrates the operation of the 'zoom' function.

If it is required to enlarge the image using the 'zoom' facility to a 2M*2N size, the algorithm in FIG. 5 is used. Otherwise, the image decompression ends there.

As shown in FIG. 5, the algorithm to enlarge the image starts by considering each 2*2 square block in turn. Each pixel within the 2*2 square block is duplicated four times to create a new 4*4 block. This is repeated until the entire image has been processed. Again, if it is required to eliminated edge-effects, interpolation across boundaries is carried out in exactly the same way as has previously been described with reference to FIG. 4.

The exact calculations and the look-up tables described with reference to this embodiment are intended to be exemplary, and it is envisaged that other functions and/or look-up tables could be used instead. Where the possible intensities of each individual pixel are known to take on one of a plurality of specific values, it is envisaged that for the purposes of speed some of the calculations of FIGS. 2 and 3 may be replaced with look-up tables.

I claim:

1. A method of spatial domain image compression comprising:
   a. taking a stored record of an image consisting of a plurality of pixels, each pixel having a respective stored intensity value:
   b. for a sub-block $b_1$ having $p_1$ pixels, determining the amount of variability between the $p_1$ pixel intensities within the sub-block;
   c. compressing the sub-block $b_1$,
      c1. by using a single intensity value $I_1$ to represent the intensities of the $p_1$ pixels in sub-block $b_1$ if the absolute difference between the intensity of each $p_1$ pixel is less than a first predetermined value; otherwise,
      c2. by using two intensity values $I_1, I_2$ to represent the intensities of the pixels in sub-block $b_1$ if a first sum of squares of differences of the $p_1$ pixels is less than a second predetermined value; otherwise,
      c3. by using intensity values from $I_3$ to $I_{(p1-1)}$ to represent the intensities of the $p_1$ pixels in sub-block $b_1$ up until a corresponding sum of squares of differences of the $p_1$ pixels is less than a corresponding value,
      c4. recording values representative of $q_1$ intensities;
   d. repeating steps b and c through c4 for successive sub-blocks $b_2, b_3 \ldots$ of respectively of $p_2, p_3 \ldots$ pixels until the entire image has been processed.

2. A method as claimed in claim 1 in which the sub-blocks have the same number of pixels.

3. A method as claimed in claim 2 in which the sub-blocks are the same shape.

4. A method as claimed in claim 3 in which the sub-blocks are square.

5. A method as claimed in claim 4 in which the sub-blocks are 2*2 pixel sub-images.

6. A method as claimed in any one of the preceding claims in which the amount of variability is determined by calculating the maximum difference between the pixel intensities within the sub-block.

7. The method of claim 5, wherein the step of compressing sub-block $b_1$ comprises the steps of:
   using a single intensity value $I_1$ to represent the four intensities of the $p_1$ pixels in sub-block $b_1$ if the absolute difference between the intensity of each $p_1$ pixel is less than a first predetermined value; otherwise,
   using two intensity values $I_1, I_2$ to represent the four intensities of the $p_1$ pixels in sub-block $b_1$ if a first sum of squares of differences of the $p_1$ pixels is less than a second predetermined value; otherwise,
   using three intensity values $I_1, I_2, I_3$ to represent the four intensities of the $p_1$ pixels in sub-block $b_1$ if a second sum of squares of differences of the $p_1$ pixels is less than a third predetermined value; otherwise, using four intensity values $I_1, I_2, I_3, I_4$ to represent the four intensities of the $p_1$ pixels in sub-block $b_1$.

8. A method as claimed in claim 1 in which the amount of variability is determined by calculating a plurality of sums of squares of intensities of different combinations of pixels within the sub-block, and taking the lowest sum of squares thus calculated.

9. A method as claimed in claim 1 including the further Steps e to g:
   e. for a larger-sub-block $B_1$ comprising a plurality of contiguous sub-blocks b, determining the amount of variability between the intensities recorded in respect of the sub-blocks b;
   f. compressing the larger-sub-block $B_1$ by applying the method of steps c through c4 to the plurality of contiguous sub-blocks b by recording values representative of $Q_1$ intensities, where $Q_1$ is less than the total number of intensities recorded in respect of the sub-blocks and is a function of the amount of variability determined in step e;
   g. repeating steps e and f for successive larger sub-blocks $B_2, B_3 \ldots$ until the entire image has been reprocessed.

10. A method as claimed in claim 9 in which each larger-sub-block consists of four 2*2 sub-blocks in a square configuration.

11. A method as claimed in claim 9 or claim 10 including the further step h:
    h. repeating steps e to g with the respective differences having been considered in respect of still-larger-sub-blocks, each still-larger-sub-block comprising a plurality of contiguous larger-sub-blocks B.

12. A method as claimed in claim 11 in which each still-larger-sub-block consists of four larger-sub-blocks in a square configuration.

13. A method as claimed in claim 9 in which the larger-sub-block or the still-larger-sub-block is not considered for further compression at Step f unless all the sub-blocks making up the larger-sub-block, or all the larger-sub-blocks making up the still-larger-sub-block, respectively, are themselves each encoded to a single intensity value.

14. A method as claimed in claim 13 in which the larger-sub-block or the still-larger-sub-block, if compressed at Step f, is encoded to a single intensity value.

15. A method as claimed in claim 1 including the final step of further compressing the image by DPCM techniques.

16. A method as claimed in claim 1 including the final step of further compressing the image by encoding according to Huffman encoding techniques.

17. A method as claimed in claim 1 in which the sub-block is encoded to a single intensity value if the maximum difference between the individual pixel intensity values is less than a cut-off value (V1).

18. A method as claimed in claim 1 in which the sub-block is encoded to dual intensity according to a algorithms, and a look-up table.

19. A method as claimed in claim 1 in which the sub-block is encoded to triple intensity according to a algorithm, and a look-up table.

20. A method as claimed in claim 1 in combination with decompressing the image after compression.

21. A method as claimed in claim 20, in which the decompression includes interpolation across boundaries of adjacent sub-blocks.

22. A method as claimed in claim 21 in which during interpolation:

| a a | b b |         | a a | b b |
|-----|-----|---------|-----|-----|
| a a | b b | becomes | a w | x b |
| c c | d d | →       | c y | z d |
| c c | d d |         | c c | d d | where w, x, y, z are interpolated values.

23. A method as claimed in claim 20, in which the decompression includes enlargement of the image by a factor of E, the enlargement being achieved by replacing each single pixel in the reconstituted image with a block of E*E identical pixels.

24. A method as claimed in claim 23 including interpolating across boundaries between adjacent sub-blocks, after the enlargement.

25. A method of spatial domain image compression comprising:
    a. taking a stored record of an image consisting of a plurality of pixels, each pixel having a respective stored intensity value;
    b. dividing the image up into a plurality of sub-blocks, each consisting of p pixels;
    compressing each sub-block
       c1. by selectively encoding it to one of $1, 2, 3 \ldots (p-1)$ intensity values by using a single intensity value $I_1$ to represent the intensities of the p pixels if the absolute difference between the intensity of each p pixel is less than a first predetermined value; otherwise,
       c2. by using two intensity values $I_1, I_2$ to represent the intensities of the p pixels if a first sum of squares of differences of the p pixels is less than a second predetermined value; otherwise,
       c3. by using three intensity values $I_1, I_2, I_3$ to represent the intensities of the p pixels if a second sum of squares of differences of the p pixels is less than a third predetermined value; otherwise,
       c4. by using intensity values from four to $(p-1)$ intensity values $I_1, I_2, \ldots I_{(p-1)}$ to represent the intensities of the p pixels up until a corresponding sum of squares of differences is less than a corresponding value.

26. A method as claimed in claim 25 including the further Step d:
    d. concatenating contiguous sub-blocks, where each is encoded to a single intensity value, into larger-sub-blocks, the larger-sub-blocks themselves each being encoded to a single intensity value.

27. A method as claimed in claim 26 including the further Step e:
    e. concatenating contiguous larger-sub-blocks, where each is encoded to a single intensity value, into still-larger-sub-blocks, the still-larger-sub-blocks themselves each being encoded to a single intensity value.

28. A method as claimed in any one of claims 25–27 in which p=4, and each sub-block comprises a 2*2 square of pixels.

* * * * *